United States Patent [19]

Krause et al.

[11] Patent Number: 4,535,218

[45] Date of Patent: Aug. 13, 1985

[54] LASER SCRIBING APPARATUS AND PROCESS FOR USING

[75] Inventors: Robert F. Krause; Gary C. Rauch, both of Murrysville; William H. Kasner, Penn Hills Township, Allegheny County, all of Pa.

[73] Assignee: Westinghouse Electric Corp., Pittsburgh, Pa.

[21] Appl. No.: 435,444

[22] Filed: Oct. 20, 1982

[51] Int. Cl.³ .............................................. B23K 27/00
[52] U.S. Cl. .......................... 219/121 LH; 217/121 LJ
[58] Field of Search ................... 219/121 LH, 121 LJ, 219/121 LA, 121 LB, 121 LR, 121 LP, 121 LQ, 121 LW, 121 LX, 121 LY; 350/6.2, 6.3, 6.5, 6.7, 6.8; 358/205, 206, 207, 285, 293, 109; 148/9.5, 110, 112, 111, 120

[56] References Cited

U.S. PATENT DOCUMENTS

| | | | |
|---|---|---|---|
| 3,154,371 | 10/1964 | Johnson | 219/121 LW X |
| 3,622,742 | 11/1971 | Cohen | 219/121 LB X |
| 3,647,575 | 3/1972 | Fiedler et al. | 148/111 |
| 3,804,534 | 4/1974 | Clarke | 356/237 |
| 3,850,698 | 11/1974 | Mallozzi et al. | 148/4 |
| 3,948,786 | 4/1976 | Evans | 148/122 |
| 3,990,923 | 11/1976 | Takashina et al. | 148/111 |
| 4,037,075 | 7/1977 | Pugsley et al. | 219/121 LM |
| 4,099,830 | 7/1978 | Whittle et al. | 350/6.8 |
| 4,122,240 | 10/1978 | Banas et al. | 148/3 |
| 4,203,784 | 5/1980 | Kuroki et al. | 148/111 |
| 4,212,900 | 7/1980 | Serlin | 427/53.1 |
| 4,259,563 | 3/1981 | Madeley | 219/121 LW X |
| 4,293,350 | 10/1981 | Ichiyama et al. | 148/111 |
| 4,338,508 | 7/1982 | Jones et al. | 219/121 LY X |
| 4,363,677 | 12/1982 | Ichiyama et al. | 148/111 |
| 4,401,477 | 8/1983 | Clauer et al. | 219/121 L |
| 4,456,812 | 6/1984 | Neiheisel et al. | 219/121 LM |
| 4,468,551 | 8/1984 | Neiheisel | 219/121 L |

FOREIGN PATENT DOCUMENTS

| | | |
|---|---|---|
| 0033878A2 | 8/1981 | European Pat. Off. . |
| 2468191 | 4/1981 | France . |
| 652230 | 3/1974 | U.S.S.R. . |

OTHER PUBLICATIONS

C. D. Elzinga, *IBM Technical Disclosure Bulletin*, "Scanner and Data Compaction System", vol. 22, No. 6, Nov. 1979, pp. 2463, 2464.

A. H. Clauer et al., "Pulsed Laser Induced Deformation in an Fe-3 Wt. Pct. Si Alloy", Metallurgical Transactions A, vol. 8A, Jan. 1977, pp. 119-125.

A. H. Clauer et al., "Effects of Laser Induced Shock Waves on Metals", Shock Waves and High-Strain--Rate Phenomena in Metals, Ed. by Meyers et al., pp. 675-680.

R. F. Krause et al., "High Frequency Magnetic Properties of Some Amorphous Alloys", IEEE Trans. on Magnetics, vol. MAG-17, No. 6, Nov. 81, pp. 2686-2691.

T. Iuchi et al., "Laser Processing for Reduced Core Loss of Grain-Oriented Silicon Steel", presented at the 27th Annual Conference on Magnetism and Magnetic Materials, Nov. 10-13, 1981, Atlanta, GA.

M. Nakamura et al., "Characteristics of Laser Irradiated Grain-Oriented Silicon Steel", presented at 3rd Join Intermag-Magnetism and Magnetic Materials Conference held in Montreal, Canada on Jul. 21, 1982.

U.S. Ser. No. 435,443 to Miller.

U.S. Ser. No. 435,822 to Krause.

*Primary Examiner*—C. L. Albritton

*Attorney, Agent, or Firm*—John J. Prizzi

[57] ABSTRACT

A machine manipulates a laser beam substantially transversely across a moving sheet of flat or curved material. This machine includes a rotating optical system which focuses and moves an elongate beam spot across the moving sheet of flat or curved material, at a high rate of speed. In methods of applying these instruments to produce reductions in watt loss in coated ferromagnetic sheet without damage to the coating, the speed of laser scanning, $S_2$ (inches/minutes), and the incident power, P (watts), of the beam are selected such that the function, $PS_2^{-\frac{1}{2}}$ is between about 0.1 to about 7.

27 Claims, 17 Drawing Figures

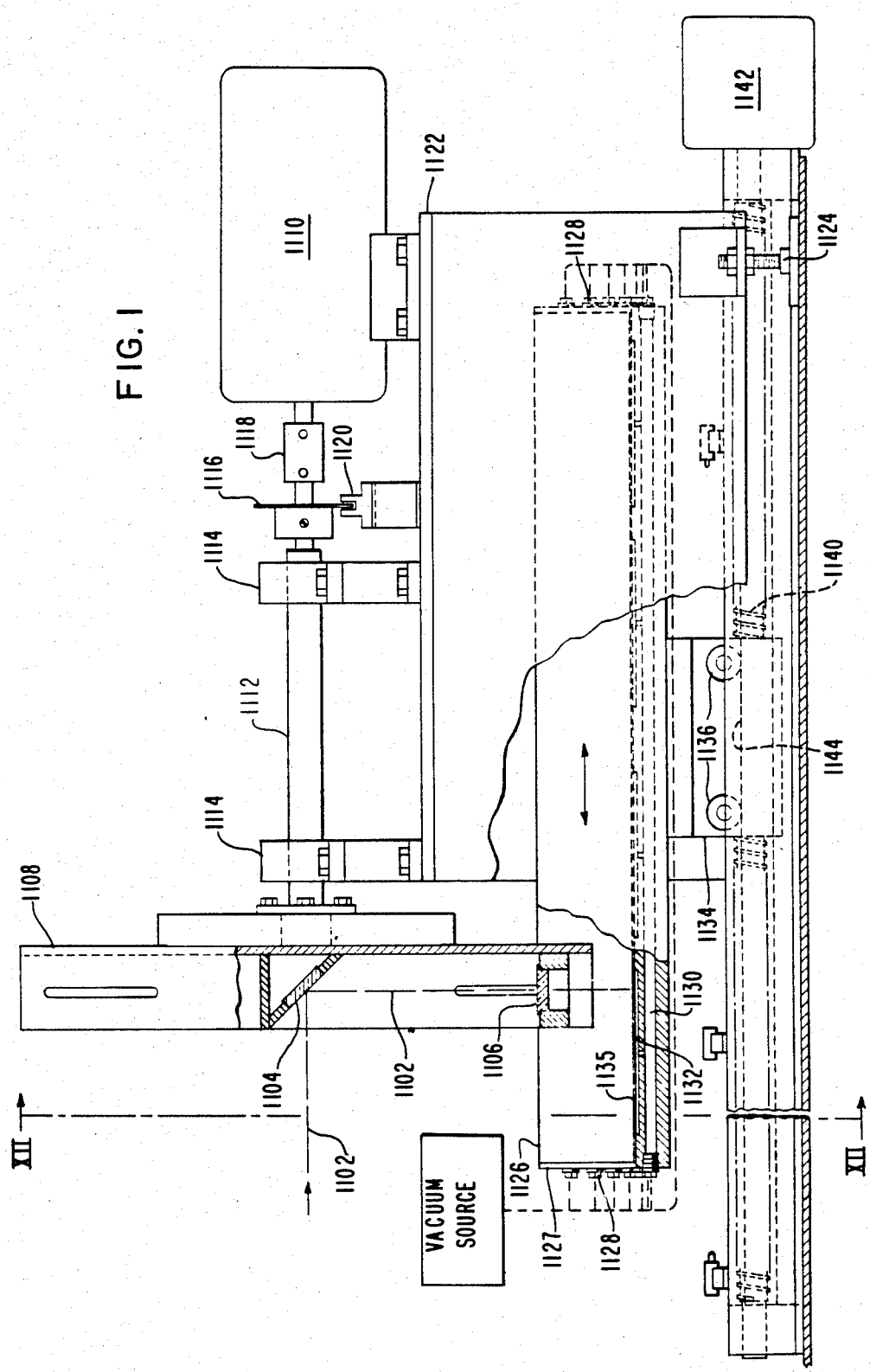

LASER SCRIBING APPARATUS AND PROCESS FOR USING

CROSS-REFERENCE TO RELATED APPLICATIONS

R. A. Miller, copending U.S. patent application Ser. No. 435,443, filed concurrently with the present application, entitled "Apparatus and Process for Laser Treating Sheet Material", relates to high speed laser scanning machines and the processes for using them to laser scribe ferromagnetic sheet material. This application is hereby incorporated by reference.

R. F. Krause and G. C. Rauch, copending U.S. patent application Ser. No. 435,822, filed concurrently with the present application, entitled "Improved Loss Ferromagnetic Materials and Methods of Improvement", relates to methods of laser scribing ferromagnetic sheet material, especially insulatively coated sheet, and the products produced thereby. This application is hereby incorporated by reference.

BACKGROUND AND SUMMARY OF THE INVENTION

The present invention pertains to high speed laser scanning equipment and processes for using it in the high speed laser scribing of ferromagnetic sheet material to refine magnetic domain spacing.

The development of high permeability grain oriented silicon steel resulted in a significant reduction in core loss, especially at inductions greater than 1.5 T (15 KG). This reduction in loss has been achieved primarily by improvements in the degree of grain orientation. Separation of the components contributing to the overall core loss has shown that the improved losses obtained are due to a reduction in the hysteresis component of the core loss. Further loss reduction can be achieved by refining the 180° domain wall spacing, which results in a lowering of the eddy current component of core loss.

Over the past several years techniques have been developed to reduce the domain wall spacing by changing the magnetostatic or the magnetoelastic energy in the sheet. Insulative coatings that apply a tensile stress parallel to the rolling direction have been effective in reducing the domain wall spacing and the core loss. Mechanical, or physical, scribing transverse to the sheet rolling direction is another technique that has been found to be effective in reducing domain spacing and lowering the losses. The disadvantages of mechanical scribing are that the insulative coating is disturbed, and the space factor is decreased.

Efforts to obtain the advantages of scribing without the aforementioned disadvantages have centered around the use of pulsed laser scribing techniques. It is known that irradiation of an iron-silicon alloy by a laser pulse of sufficient power density can vaporize material at the alloy surface causing a pressure shock wave to travel through the alloy causing dislocations and twins (see A. H. Clauer et al, "Pulsed Laser Induced Deformation in an Fe-3 Wt. Pct Si Alloy," Metallurgical Transactions A, Vol. 8A, January 1977 pp. 119–125). This deformation, like the deformation produced by mechanical scribing, can be used to control domain spacing. In fact, pulsed lasers have been applied to grain oriented electromagnetic steel sheet to produce shock wave induced arrays of deformation (see, for example, U.S. Pat. No. 4,293,350, French Patent Application No. 80/22231 published on Apr. 30, 1981 Publication No. 2,468,191, and European Patent Application No. 0033878 A2).

Despite the above efforts, there still exists a need for the development of instrumentation and processes capable of scribing at the high speeds necessary to make scribing of large lots of heats or ferromagnetic material practical on a high volume high throughput basis. The present invention addresses these needs.

Applicants have developed machines and processes that are capable of meeting these needs. According to the present invention this equipment includes a rotatable means for deflecting a laser beam and a means for focusing the laser beam onto the object to be scribed. Also included in this machine is a means for moving the object to be treated through the path of the laser beam. When said rotatable means for deflecting the laser beam is rotating it translates the laser beam substantially transverse (i.e. within ±45° of perpendicular to) to the direction of movement of the object.

In one embodiment of the present invention the means for focusing and means for deflecting may be incorporated into one device, however, in other embodiments, where they are separate entities, it is preferred that a means for focusing be positioned between the means for deflecting the beam and the sheet of material to be treated.

The rotatable means for deflecting is preferably a mirror coupled to a variable speed motor.

The focusing means may be a lens or a mirror. Preferably it has a cylindrical type geometry so as to produce an elongate beam spot on the sheet being scribed.

Included within the present invention is a laser beam source, preferably one capable of operating in a continuous wave or extended pulse mode, such as a $CO_2$, Neodymium YAG or Neodymium Glass laser.

The means for translating the sheet past the laser preferably includes rolls, or a table having a vacuum check or a magnetic chuck, suitably shaped to elastically curve the sheet and thereby keep the sheet surface being scribed within a predetermined distance of the focal plane of the focusing means across the entire path of the laser. Preferably the sheet surface is maintained, as nearly as possible, at the focal plane of the focusing means.

Alternatively, also in accordance with the present invention, the sheet surface may be held in a planar configuration during scribing. In this embodiment according to the present invention the rotatable means for deflecting includes groups of mirrors circumferentially as well as axially distributed around a common axis of rotation. This common axis of rotation is aligned substantially transverse to the direction of movement of the sheet (i.e. rolling direction) and the mirrors within each group are orderly distributed over a length, parallel to the axis, that is substantially equivalent to the width of the sheet. Upon rotation each mirror is sequentially brought into the path of the laser beam deflecting it onto the sheet surface and incrementally moving the beam across the sheet surface.

Also in accordance with the present invention, a process for using the aforementioned laser scribing instruments is disclosed. A ferromagnetic sheet traveling in a first direction at a speed, $S_1$, is scribed by a laser beam traveling in a second direction substantially transverse to said first direction, and at a speed, $S_2$. The laser beam produces a predetermined beam spot size and shape on the sheet and scribe lines having a predetermined spacing. In this process $S_2$ and P, the incident power of the beam, are selected in such a manner that the following conditions are satisfied:

(1) $0.1 \lesssim PS_2^{-\frac{1}{2}} \leq 7$ (where P is in watts and S in inches/minute).
(2) The laser beam power density does not produce shock deformation.
(3) The laser beam incident energy density is greater than 10 and less than about 200 joules/cm$^2$.

The aforementioned and other aspects of the present invention will become more apparent upon examination of the drawings, which are briefly described below, in conjunction with the detailed description of the invention.

BRIEF DESCRIPTION OF THE DRAWINGS

FIG. 1 is a partially broken away side view of an embodiment of the present invention;

DETAILED DESCRIPTION OF THE INVENTION

Figure 3:
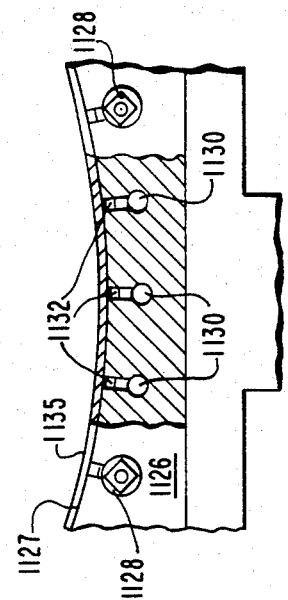
FIG. 3 is a side view blow up of the focusing system and the vacuum chucking system shown in FIG. 1.

The present invention pertains to machines for high speed laser scribing of ferromagnetic sheet material and the procesess for using these machines. The following presentation will enable those of ordinary skill in the art to apply the present invention to their specific applications. It has been found that it is possible to reduce watt losses in sheets of ferromagnetic material having an insulative coating by scribing said material with a laser beam operating in a continuous wave or extended pulse mode. It has been found that under the appropriate laser scanning parameters the magnetic domain size of the material can be refined without damage to the insulative or surface roughness properties of the coating.

It is the applicants' belief that the advantageous results of the present invention are due to the rapid heating of a narrow band of material by the laser to an elevated temperature below the solidus and the immediately following rapid self quenching of the heated band of material. A difference in temperature is created between the laser treated and surrounding untreated material which is large enough to produce plastic deformation, or residual stresses, within the thermally treated band due to the stresses developed in it during the treatment because of the constraints imposed on its thermal expansion by the surrounding relatively cold material.

To achieve these conditions, while avoiding damage to the coating, the laser must be able to rapidly heat the narrow band of material to the elevated temperature required without the production of a shock wave, and preferably without causing melting of the material. It has been found that these requirements can be met if a laser is utilized to produce a beam having a power density of less than that required to produce shock deformation in the material (see A. H. Clauer et al, "Effects of Laser Induced Shock Waves in Metals, "Shock Waves and High-Strain-Rate Phenomena in Metals, ed. by M. A. Meyer et al, Plenum Publishing Corp., N.Y., N.Y., (1981) p. 675. Pages 676 through 680 of this article are hereby incorporated by reference.), while producing an incident energy density input of greater than 10 and less tha about 200 joules/cm$^2$. Power densities below about $1 \times 10^6$ watts/cm$^2$ with a dwell time of less than about 10 milliseconds (to avoid melting), and providing the above energy densities are believed to be suitable for these purposes. It has been found using high permeability grain oriented silicon steel having an insulative stress coating that significant improvements in watt losses can be obtained if that incident power density is between about $1 \times 10^3$ and $1 \times 10^5$ watts/cm$^2$ with a dwell time preferably of about 0.1 to 5 milliseconds to produce an incident energy density of about 11 to 50 joules/centimeter$^2$. Lasers operating in a continuous wave, or extended pulse, mode meeting the above requirements have been found to be useful.

The improvements obtained further depend upon the width of the deformation zone produced by the laser and the spacing between deformation zones.

While not wishing to be bound by theory the applicants believe that the understanding of, use of, and the advantageous results obtained from, the present invention can be furthered by the following theory:

In the absence of shock deformation effects, it is our belief that the extent of localized heating is an important factor, perhaps leading to localized deformation because of constrained thermal expansion. For most of the dwell times and laser beam spot sizes used in the present invention it is believed that as a first approximation one can assume that most heat flows downward into the material with little heat loss occurring in other directions. For an idealized one dimensional heat flow model the change in temperature should be described by equation (1) as follows:

$$\Delta T = \frac{2\alpha I}{k}\left(\frac{\kappa t}{\pi}\right)^{\frac{1}{2}} \quad (1)$$

where

ΔT = maximum increase in surface temperature (°K.)
I = incident beam power intensity (W/cm²)
t = dwell time of beam on surface (sec)
κ = thermal diffusivity (cm²/sec)
k = thermal conductivity (W/cm.°K.)
α = absorptance If one further assumes that the beam spot has a uniform power density over its diameter or length, d, instead of the typical gaussian distribution, the dwell time at the center of the beam trace, or scribe line, is given by $$t = d/S \quad (2)$$

where S is the scan speed.

The incident beam power, P, is given by $$P = AI = \frac{\pi d^2}{4} I \text{ (round spot)} \quad (3)$$

where A is the area of the beam spot with uniform power intensity. Combining equation (1), (2) and (3) produces $$\Delta T = \frac{8\kappa^{\frac{1}{2}} \alpha P}{\pi^{3/2} k \, d^{3/2} S^{\frac{1}{2}}} \quad (4)$$

or, for a given material, beam geometry and size, and laser wavelength $$\Delta T \propto P \cdot S^{-\frac{1}{2}} \quad (5)$$

While it is not believed that equation (4) will provide a quantitatively accurate ΔT for the complex situation actually existing during laser treatment, it is believed that equation (4) can be useful for making qualitative comparisons and predictions of power, speed and energy requirements between different materials. The parameter $P \cdot S^{-\frac{1}{2}}$ for a given material, laser wavelength, beam geometry and size, and scribe line spacing, has been found to be a useful plotting variable for the core loss changes produced by the present invention.

The relationship $P \cdot S^{-\frac{1}{2}}$ indicates that high speed laser scribing is possible without the need to linearly increase power with linearly increasing scan speed. However, as scan speed increases, dwell time decreases for a given round spot diameter, and would ultimately lead to coating damage due to shock induced effects produced by the higher power densities required to get the needed energy density. It has been found that the limitation on scan speed can be overcome by changing the beam spot geometry from a round to an elongate one, wherein the major dimension of the spot is aligned parallel to the scanning direction. In this manner the laser dwell times, and power densities, and beam width required by this process to avoid coating damaged are maintained while scan speed can be greatly increased. Such an elongated spot can be produced, for example, by utilizing a cylindrical lens.

In order to effectively obtain the potential high scan speeds that elongated beam spots now enable one to use, an effective way of high speed manipulating of the beam at a constant speed is required.

Figure 2:
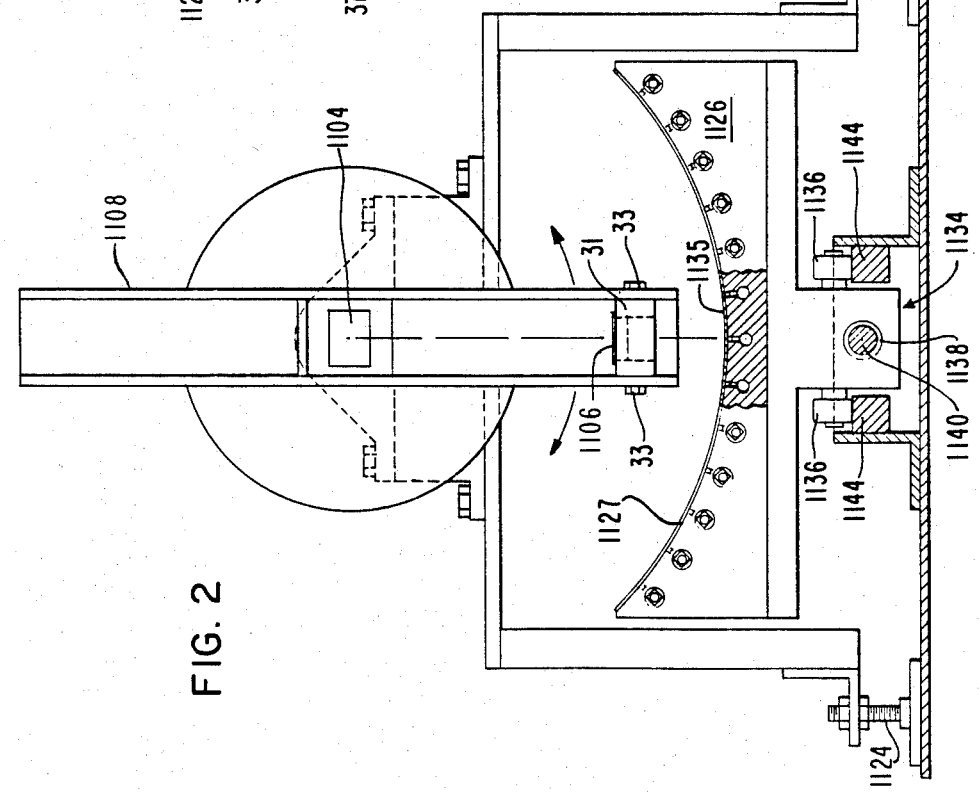
FIG. 2 is a frontal view of the embodiment shown in FIG. 1.

FIGS. 1 and 2 illustrate an embodiment of such a high speed laser scanning apparatus in accordance with the present invention and utilized in the following examples of high speed laser scanning processes. FIG. 1 shows a partially broken away side view of the laser scanning apparatus. A diagonal mirror 1104 is shown mounted in the rotational center of support arm 1108 which adjustably holds at one end a cylindrical lens 1106. The diagonal mirror 1104 is optically aligned with the cylindrical lens 1106 such that an incident beam of laser light 1102 aligned with the axis of rotation of the diagonal mirror 1104 will be deflected by mirror 1104 through lens 1106. Cylindrical lens 1106 then focuses the beam 1102 into an elongated spot on the ferromagnetic sheet 1135 surface. A gold coated stainless steel mirror 1104 and zinc selenide lens 1106 were used in the following examples.

As shown in more detail in FIGS. 2 and 3 cylindrical lens 1106 is retained in a fixed position within a mounting collar 31 which is held by screws 33 on the support arm 1108. Screws 33 extend through slots 35 in the support arm 1108. Slots 35 are long enough to accommodate the mounting of lenses 1106 having a variety of focal lengths or the adjustment of the position of a lens 1106 to bring the sheet surface 1135 into or out of the focal plane of the lens by a predetermined amount, and thereby respectively provide a decrease or increase in the spot size produced on the surface 1135.

Returning now to FIG. 1 it can be seen that the support arm 1108 is mounted on a steel shaft 1112 which is coupled by coupling 1118 to a DC variable speed motor 1110. The steel shaft 1112 is rotatably mounted in yokes 1114 containing ball bearings. The yokes 1114 are in turn mounted on a hollow base member 1122. Mounted on the steel shaft 1112 is a tachometer ring 1116.

Figure 5:
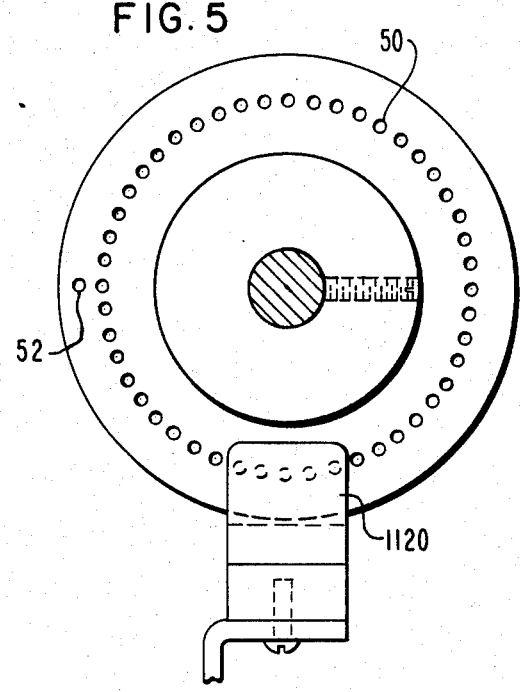
FIGS. 5 and 6 are frontal and side views respectively of the tachometer system shown in FIG. 1.
Figure 6:
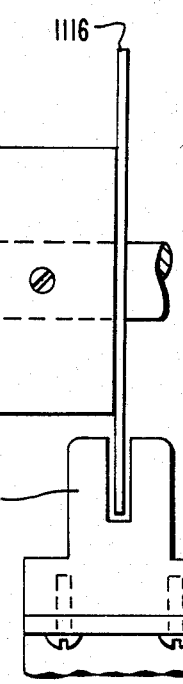

As shown in FIGS. 5 and 6 the tachometer ring 1116 has an inner circle of holes 50 extending axially through it and at least one axial hole 52 at a radius different from the circle of holes. These holes pass between two pairs of LEDs (light emitting diodes) and photo optic sensors 1120 mounted on the hollow base member 1122.

The first LED and photo optic sensor pair is arranged to be interrupted by the ring of holes 50 and sends an electrical signal to a display device that shows the rotations per minute based on the frequency with which the light emitted by the LED is interrupted.

The second LED and photo optic sensor pair are arranged with hole 52. The electric signal obtained from this arrangement is sent to the laser source and allows for the triggering of the laser beam only when the beam is incident on the ferromagnetic sheet, and if desired, only every second, third, etc. pass over the sheet 1135.

As can be seen in FIGS. 1 and 2, located within the hollow base member 1122, but not an integral part thereof, is a sheet table 1126 for holding the ferromagnetic sheet 1135 which will be scribed by the laser. The table 1126 has an upward facing cylindrical surface 1127 which appears concave when viewed on end, as in FIG. 2. As seen in FIG. 2, surface 1127 defines an arc having a radius of curvature equal to the distance between it and the rotational axis of the diagonal mirror 1104 so that the laser beam hitting the ferromagnetic sheet 1135 held on surface 1127 will always have the same degree of focus along its entire path across the sheet 1135.

Figure 4:
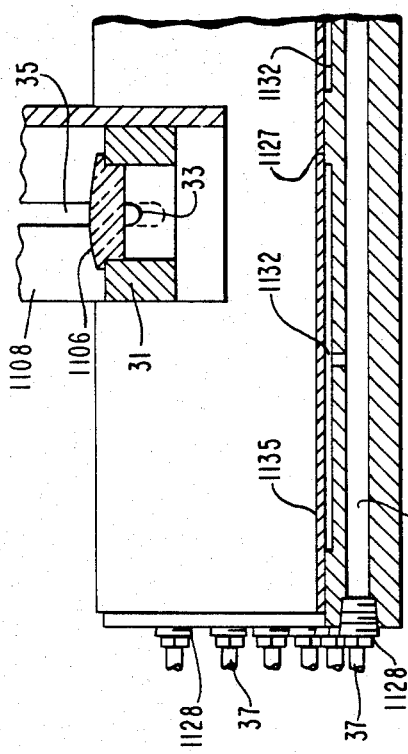
FIG. 4 is a frontal view blow up of the vacuum chucking system shown in FIG. 2.

As shown in FIGS. 3 and 4 the ferromagnetic sheet 1135 is held against concave surface 1127 by means of a vacuum chucking system. Arranged in an arclike array within table 1126 and beneath surface 1127 are a series of passageways 1130 which are connected with slots 1132 opening up on concave surface 1127. Flexible vacuum lines 37 are connected at 1128 to passageways 1130. The sheet 1135 is then fixed against the concave surface 1127 when a partial vacuum is established in passageways 1130 and slots 1132. In this manner the upper surface of the sheet takes on a concave shape which is held during the entire laser treatment cycle.

As shown in FIGS. 1 and 2 the lower portion of the table 1126 is mounted upon a truck 1134 having wheels 1136 which allows the entire table 1126 and truck 1134 assembly to be rolled within tracks or channel 1144. Within the truck a theaded axial hole 1138 extends from its front to its back. The truck 1134 is nonrotatably mounted on, and threadedly engaged to, a long rotatable screw 1140 which can be driven by another variable speed motor 1142 to which it is connected. Rotation of screw 1140 causes the table 1126 to move axially along the length of the screw.

Looking at FIG. 2, it can be seen that the table 1126 is aligned such that the rotational centerline of the sheet 1135 on the cylindrical surface is as closely as possible coincident with the axis of rotation of the diagonal mirror 1104. Accurate alignment is aided by the downwardly extending adjustable feet 1124 of base member 1122.

Using the device shown in FIGS. 1 and 2 nominally 12 mil thick sheets (16 inches wide, by 26 inches long) of CARLITE-3 coated TRAN-COR H were laser scribed on one side only using the processing parameters shown in Table I.

TRAN-COR H is a trademark of ARMCO Inc. of Middletown, Ohio. It is a high permeability grain-oriented silicon steel using AlN inhibition to promote secondary recrystallization. CARLITE-3 is an ARMCO trademark for an aluminum-magnesium-phosphate-chromium-silica insulative glass stress coating typically of about 3-4 microns in thickness, and bonded to, and over, a mill glass coating. The CARLITE-3 stress coating is typically cured at a temperature above 600° C. This stress coating applies tension to the underlying silicon steel and thereby produces domain refinement. The family of insulative stress coatings to which CARLITE-3 is a member, and the method of applying them to silicon steel and mill glass coated silicon steel, are described in U.S. Pat. No. 3,948,786 which is hereby incorporated by reference.

direction of travel of the table and having an effective zone of approximately 0.003-0.004 inches by 0.5 inches. A $CO_2$ CW laser beam was provided by a Photon Sources Model V500, 500 watt laser. The beam as it entered the cylindrical lens was circular in cross-section and had a gaussian energy distribution.

Figure 7:
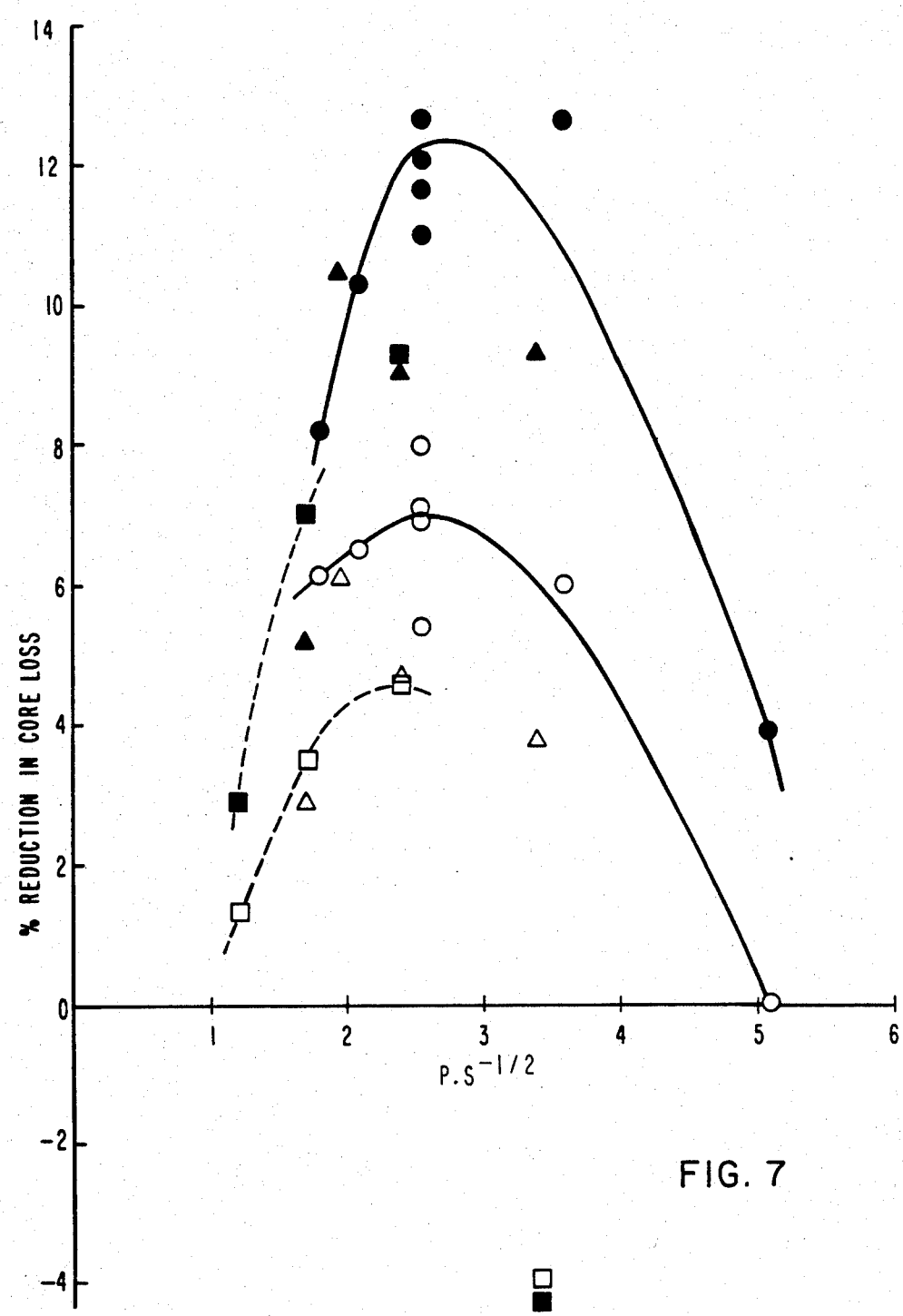
FIGS. 7-8 show the percent core loss reduction produced according to this invention as a function of $P \times S^{-\frac{1}{2}}$ for various high speed laser scanning parameters.
Figure 8:
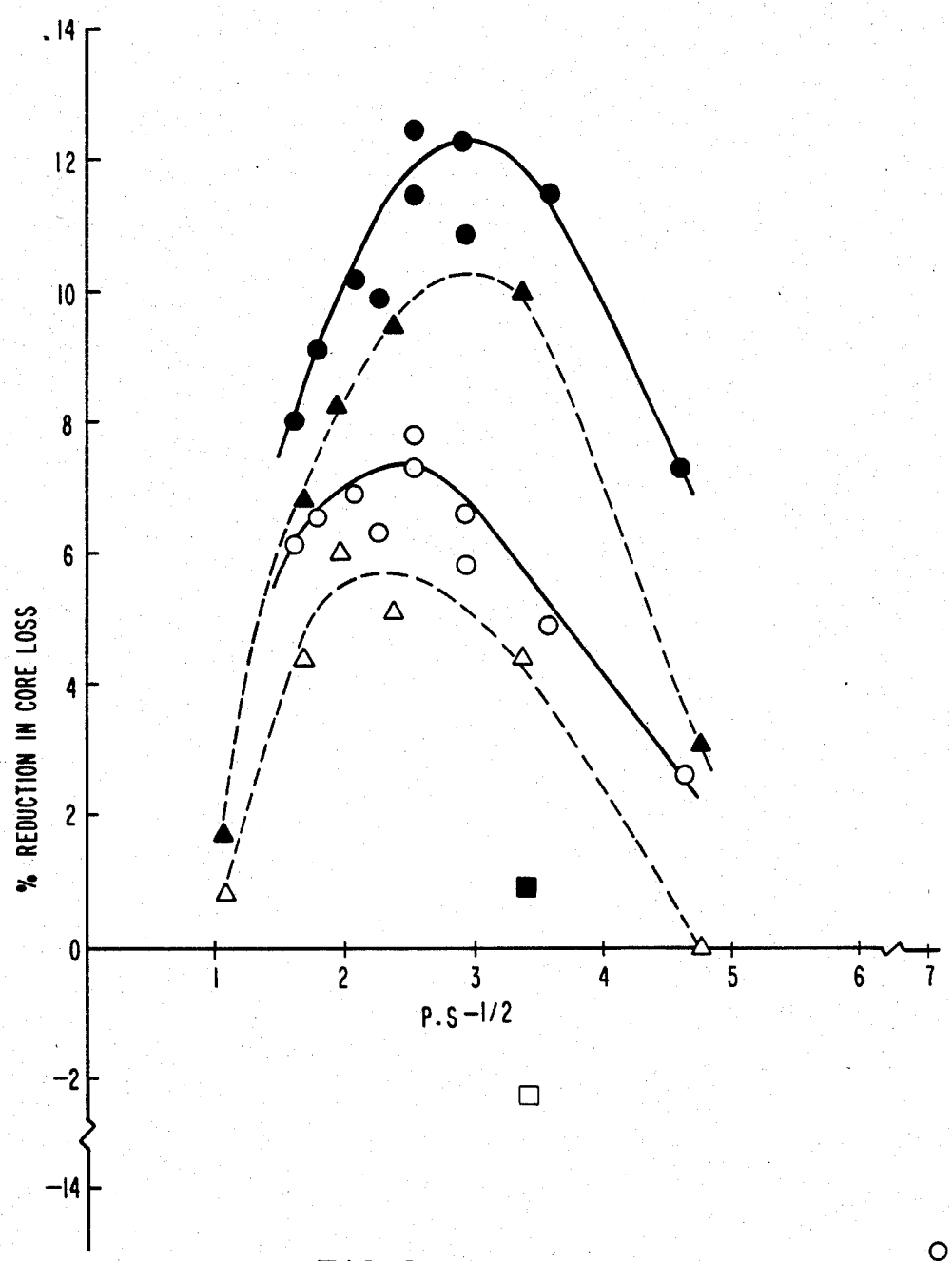

The changes in core loss at inductions of 10 (■,▲,●) and 15 (□,△,o) kG as a function of $P \cdot S^{-\frac{1}{2}}$ as measured on the treated, single full width sheets are plotted in FIGS. 7 and 8 for a 5" focal length lens and a 2.5 inch focal length lens respectively. It can be seen that there are optimum values of $P \cdot S^{-\frac{1}{2}}$ between 1.0 and 7.0 watt $(min./in.)^{\frac{1}{2}}$, preferably between 1.0 and 5.0, for which the core loss reduction is maximized. At a given induction separate core loss curves were produced for each laser power evaluated (150 (■,□), 300 (▲,△), and 450 (●, o) W) possibly due to the wide variation in power having an effect on the spot size produced on the sheet.

The data plotted in FIGS. 7 and 8 utilized a nominal 0.25 inch scribe spacing. For a given power, spot size and geometry, different scanning speeds have different optimum scribe spacings for producing optimum core loss improvements. Where significant improvements were made in core loss there typically was no damage and little visual evidence of scribing seen in the coating. For the higher $P \cdot S^{-\frac{1}{2}}$ values shown (i.e. greater than 4.5 to 5.0) there may be some minor melting of the coating at preexisting surface flaws in the coatings. At the lower $P \cdot S^{-\frac{1}{2}}$ values shown (i.e. less than 1) it is believed that the energy density or power density were insufficient to produce enough of a sudden temperature increase to produce stresses having a significant affect on domain size for the scribe spacing being evaluated. $P \cdot S^{-\frac{1}{2}}$ values as low as about 0.1 watt $(min./inch)^{\frac{1}{2}}$ are contemplated for processes using a round beam spot geometry.

Figure 9:
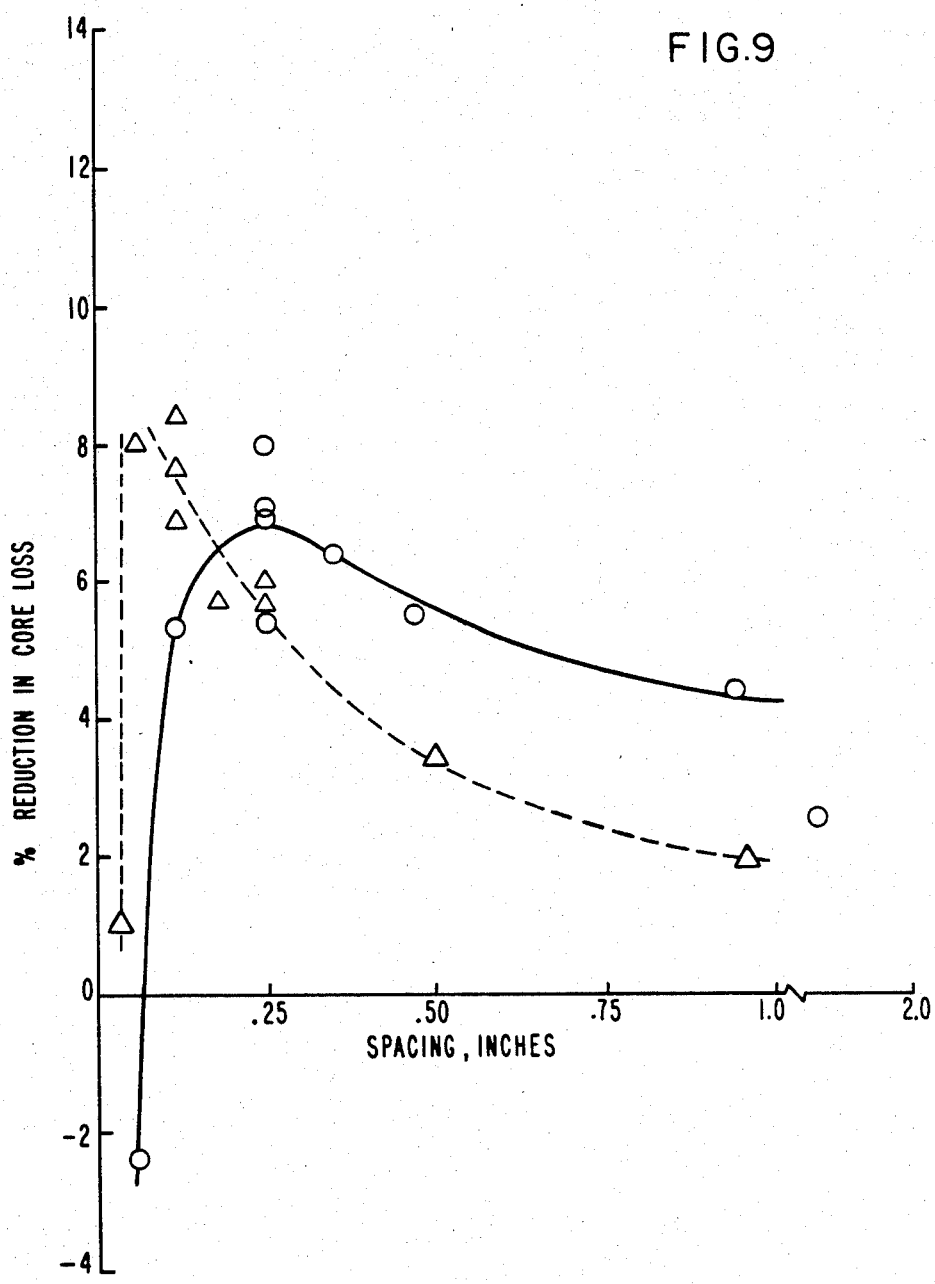
FIG. 9 shows the percent core loss reduction as a function of the spacing between scribe lines for two high speed laser scanning processes.

FIG. 9 shows the variation in percentage reduction in core loss at 15 kG plotted against scribe spacing for scanning speeds of about 31,400 (o) and about 78,500 (△) inches per minute a 450 watt beam. The optimum scribe spacing for the 31,400 ipm scribe speed is about 0.25 inches and the optimum scribe spacing for the 78,500 ipm speed is about 0.07-0.12 inches.

The variation in the percent reduction in core loss as

TABLE I

| | HIGH SPEED LASER SCRIBING PARAMETERS AND RESULTS | | | | | | |
|---|---|---|---|---|---|---|---|
| Spec. | Lens f.l. (in.) | Defocus (in.) | Rotational Speed (rpm) | Table Translation Speed (ipm) | Incident Power* (W) | Incident Power Density* (W/cm.$^2$) | Dwell Time* (sec.) |
| 80 | 5 | 0 | 500 | 31400 | 63 | 450 | $3.5 \times 10^4$ | .001 |
| 95 | 5 | 0 | 375 | 23600 | 47 | 300 | $2.3 \times 10^4$ | .0013 |
| 114 | 2.5 | 0 | 500 | 31400 | 63 | 450 | $3.5 \times 10^4$ | .001 |
| 126 | 2.5 | 0 | 1250 | 78500 | 52 | 450 | $3.5 \times 10^4$ | .0004 |
| 144 | 2.5 | 0 | 1250 | 78500 | 39 | 450 | $3.5 \times 10^4$ | .0004 |
| 146 | 2.5 | 0 | 1250 | 78500 | 78 | 450 | $3.5 \times 10^4$ | .0004 |

| Incident Energy Density* (J/cm.$^2$) | Laser on Frequency (pass) | Scribe Spacing (in.) | % Charge in Core Loss (60 Hz) | | | | $P S^{-\frac{1}{2}}$ $W min^{+\frac{1}{2}}$ in.$^{\frac{1}{2}}$ | Spec. |
|---|---|---|---|---|---|---|---|---|
| | | | 10 kG | 13 kG | 15 kG | 17 kG | | |
| 35 | second | .23 | −12.7 | −9.7 | −8.0 | −8.4 | 2.54 | 80 |
| 30 | second | .25 | −10.5 | −7.8 | −6.1 | −5.7 | 1.95 | 95 |
| 35 | second | .24 | −12.5 | −10.1 | −7.8 | −7.6 | 2.54 | 114 |
| 14 | third | .12 | −11.2 | −9.5 | −8.4 | −8.0 | 1.61 | 126 |
| 14 | every | .028 | −0.4 | 0 | −1.0 | −3.2 | 1.61 | 144 |
| 14 | sixteenth | .96 | −2.1 | −1.5 | −1.9 | −2.0 | 1.61 | 146 |

*These values are approximations based on the simplifying assumptions that:
(1) the incident beam spot was of a constant size for all incident power levels;
(2) the beam spot was a rectangle 0.5" × .004"; and
(3) that the power density was constant across the entire beam spot area.

Figure 10:
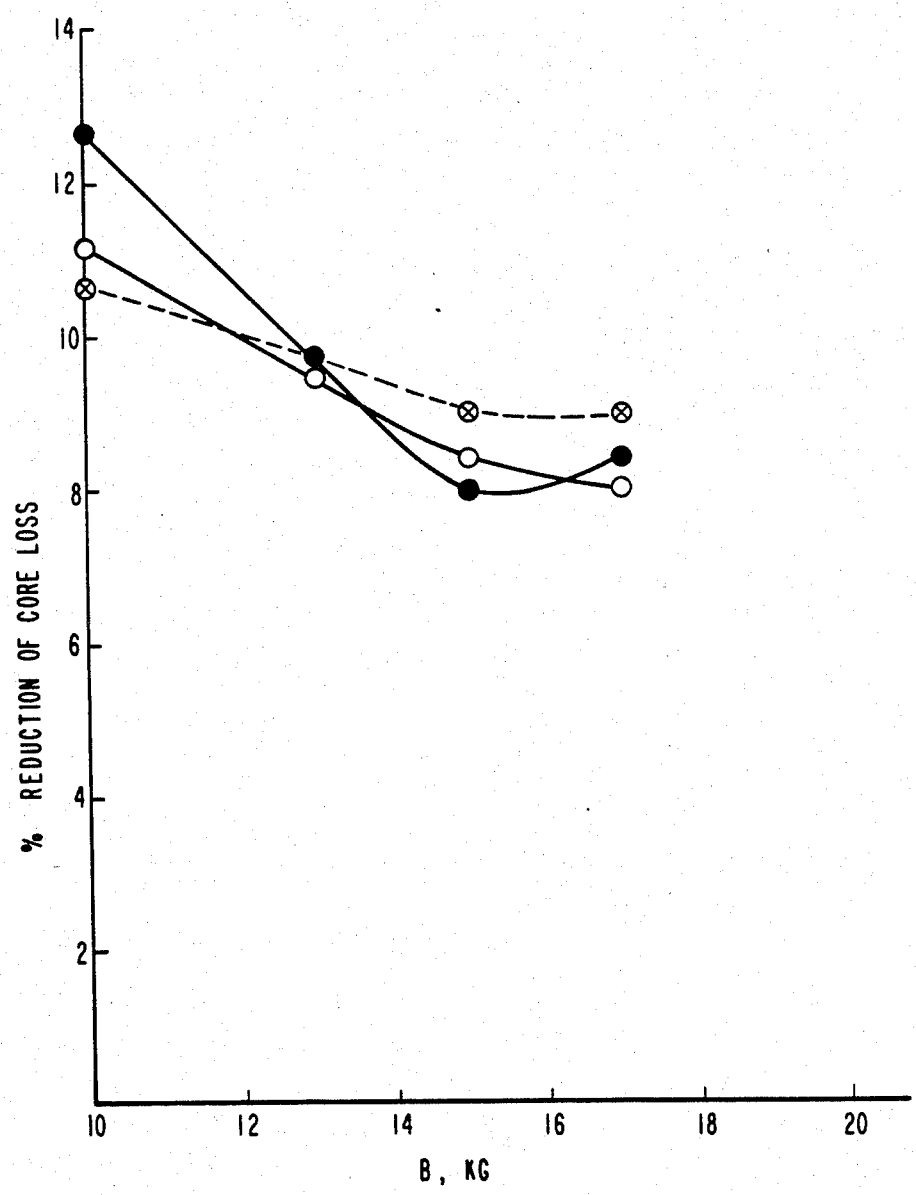
FIG. 10 shows percent core loss reduction as a function of the induction for three sets of laser scanning parameters.

A cylindrical lens was used in each case to provide an elongated elliptical spot aligned perpendicular to the a function of induction is shown in FIG. 10 for a 450 watt beam used to scribe at 31,400 ipm with a 0.25 inch spacing (●) and at 78,500 ipm with a 0.125 inch spacing (○).

Also shown in this figure are 78,500 ipm, 0.12 inch spacing results with a circular $\frac{3}{8}$ inch diameter aperture placed in the path of the incoming $\sim\frac{1}{2}$ inch diameter round 450 watt beam to produce an elliptical beam spot on the sheet surface of about 0.004 inch $\times \frac{3}{8}$ inch (⊗).

Figure 11:
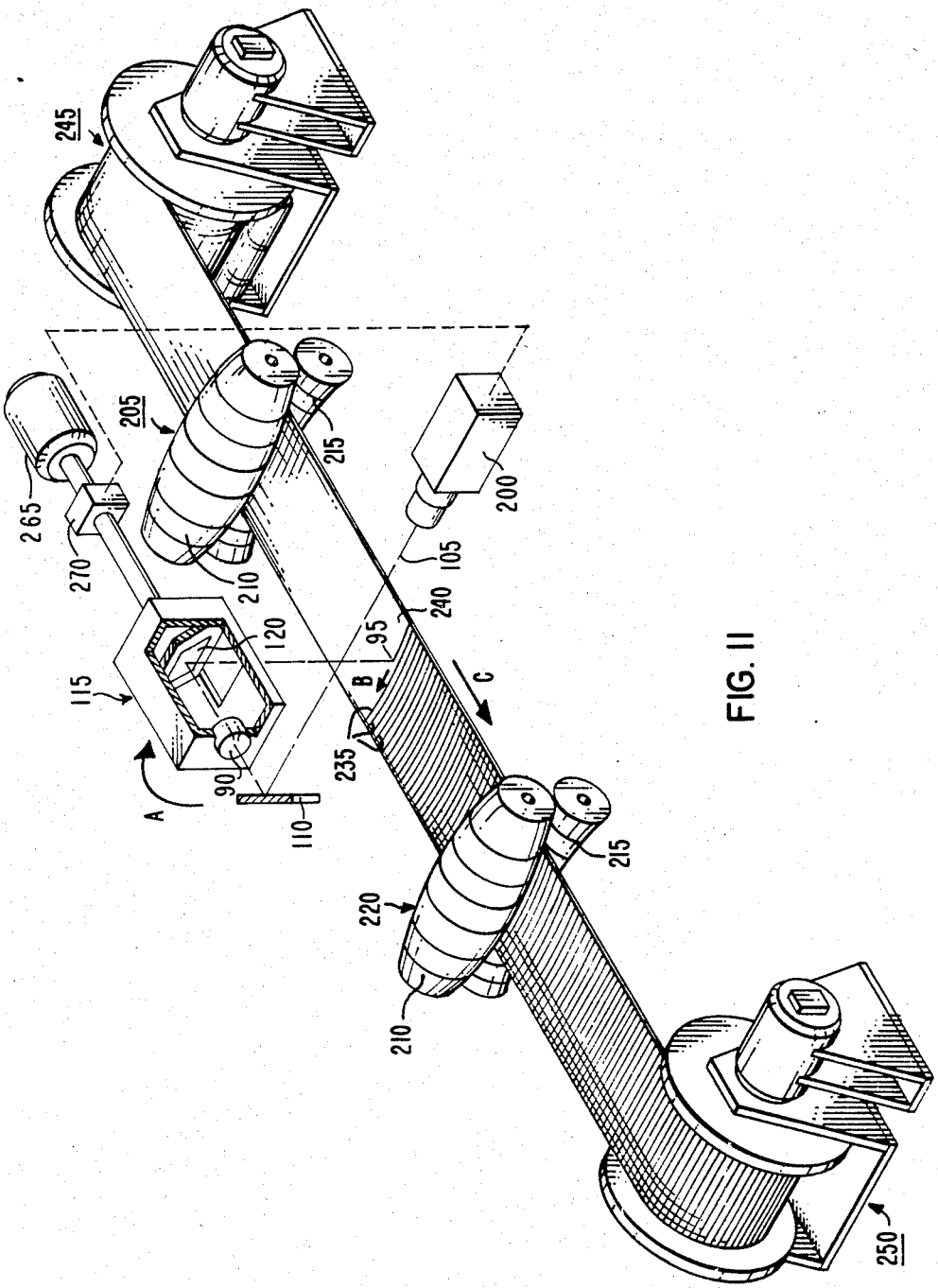
FIG. 11 is a schematic perspective view of an embodiment of the present invention.

The device shown in FIG. 1 may be adapted to high speed laser scribe long, almost infinite, lengths of ferromagnetic sheet material as shown in the schematic perspective view provided in FIG. 11. This figure shows a coil of flat ferromagnetic sheet material mounted on a motor driven uncoiling reel 245. The sheet is threaded through two pairs of freely rotatable segmented rolls 205 and 220. Each pair of rolls has a convex roll set 210 and a matching concave roll set 215 which impart a curved shape to the sheet 240 without plastically deforming the sheet. Each segment in each roll is independently rotatable with respect to the other segments. For 0.011 inch thick by 18 inch wide sheet, bend radii greater than 8" have been found to produce no detrimental effect on the steel, and radii of approximately 15 to 18 inches are contemplated. The minimum bend radius will, of course, depend on material thickness.

Located between the two pair of rolls 205 and 220 is the laser manipulation system. A laser source 200, which may be for example, pulsed or continuous wave, and $CO_2$, Neodymium YAG or Neodymium Glass, sends a laser beam to stationary mirror 110 which aligns the beam with the rotating optics system 115 rotating in direction A. The rotating optics system includes a rotating lens 90 and rotating mirror 120 which rotate together to produce an elongate beam spot 95 having a fixed orientation with respect to the direction of sheet translation C. The beam is reflected off mirrored surface 120 and travels in direction B forming a scribe line 235 on the surface of the sheet 240 as it travels in direction C under the laser beam. While scribe lines 235 are visible in FIG. 2 for the sake of illustration, it is contemplated, that preferably, that the scribe lines produced would be invisible to the naked eye.

Variable speed motor 265 rotatably drives the rotating optics system 115. Mounted on the shaft connecting variable speed motor 265 and the rotating optics system 115 is a tachometer device 270 for measuring the speed and orientation of the rotating optics system 115 and signaling the laser source 200 when to fire laser beam 105 so that the beam is on, only, when it will be reflected onto sheet 240.

The translational speed of sheet 240 and the rotational speed of the rotating optics system 115 are matched so as to provide the desired distance between scribe lines on the steel.

For example, for a single rotating optical system, the minimum laser beam scan speed required to achieve a scribe spacing, can be calculated as follows:

$$S_2 = W/[L/S_1] \qquad (6)$$

where
W = sheet width
L = scribe spacing
$S_1$ = sheet translational speed
$S_2$ = laser scan speed This assumes that as soon as one scribe line is completed the laser beam is ready to begin scribing another. The optical systems shown in copending application Ser. No. 435,443 or in FIGS. 14 through 17 of this application, where more than one scribe line can be made for each rotation of the optical system, can be modified to attain this scribe spacing at the minimum speed calculated above. However, for optical systems where only one scribing pass is made in each rotation of the optical system the minimum speed for a single rotating optical system to achieve a desired scribe spacing is as follows:

$$S_2 = [2\pi R]/[L/S_1] \qquad (7)$$

where R is the radius of curvature of the sheet.

Scanning speeds lower than those calculated by equations (6) and (7) can be utilized to attain a desired final scribe spacing where multiple rotating optical systems, each scribing with its own laser beam (produced by the use of a single laser source and one or more beam splitters, or multiple laser sources) are utilized. Under these conditions, the minimum laser scan speed may be calculated as follows:

$$S_2 = [2\pi R]/\left[\frac{nL}{S_1}\right] \qquad (8)$$

where n = the number of rotating optical systems being utilized to scribe the sheet.

After passing through the pair of segmented rolls 220 the elastically curved sheet is allowed to return to its original flat shape and coiled up on motor driven take up reel 250.

While FIG. 11 illustrates the use of the present invention as a separate processing line which may be at the user's or producer's plant, it is contemplated that the laser scribing system described can be also integrated into a continuous or semicontinuous already existing line within the standard processing sequence where sheet translational speeds of about 100 to 1000 feet per minute may be attained.

In applications where the translational speed of the sheet is a significant fraction of the laser beam scan speed at the sheet surface (e.g. greater than about 10%) it is preferred that the cylindrical lens be adjusted to minimize scribe zone width. For example, if the sheet is moving perpendicular to the beam scanning direction a certain amount of elongate beam smearing will occur if the axis of the cylindrical lens is also perpendicular to the direction of sheet travel. This smearing will widen the width of the laser scribed zone in the sheet. To eliminate this smearing effect, the axis of the cylindrical lens can be rotated through an angle equal to $\theta = \tan^{-1}(S_1/S_2)$, (where $S_1$ = sheet speed and $S_2$ = laser beam scan speed) to produce an elongate beam spot on the sheet surface which extends rearwardly relative to the direction of sheet travel as it extends in the beam scan direction. Under these conditions, the major axis of the elongate beam spot would no longer be parallel to the direction of beam travel but forms the angle $\theta$ with it. The plane of rotation of the beam may be rotated to bring the scan path (or scribe line produced) perpendicular to the direction of strip travel, or to other desired angles.

Figure 12:
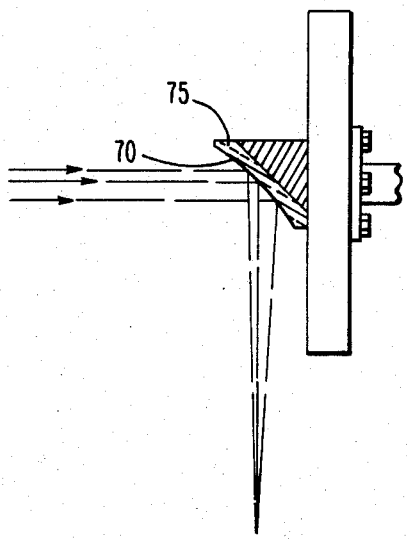
FIGS. 12 and 13 show in schematic form alternative embodiments of rotating optical arrangements for use in the embodiments of the present invention shown in FIGS. 1 and 11.
Figure 13:
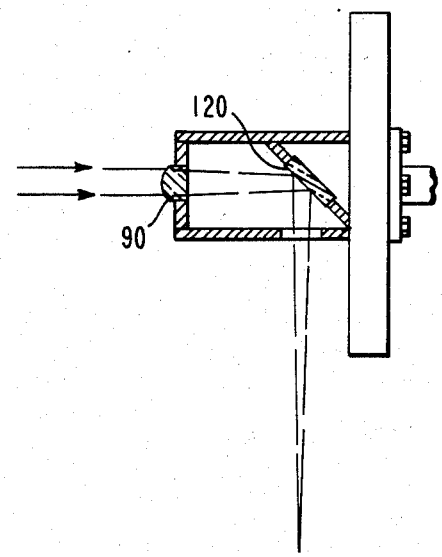

Although the present invention has been illustrated in FIG. 11 with a rotating optics system 115 shown in FIG. 13, it is contemplated that other systems, such as the ones shown in FIGS. 1 and 12, may also be utilized and may be preferred depending upon the specific requirements of each application.

The rotating optics system shown in FIG. 1 has the advantage of having the capability of using short focal length cylindrical lenses which can provide a smaller spot size than the long focal length cylindrical lens 95 (for a given incoming beam diameter) required by the FIG. 13 system. The rotating optics system of FIG. 1 may however not be optimum for systems where centripetal forces exerted on the lens are high enough to affect performance. In these cases the rotating optics systems shown in FIGS. 12 and 13 would be preferred since centripetal forces are minimized on the optics of these systems. FIG. 12 shows a rotating mirror 75 having an off axis paraboloid reflective surface 70 which acts to both reflect and focus the laser in an elongate spot on the sheet being scribed.

Figure 14:
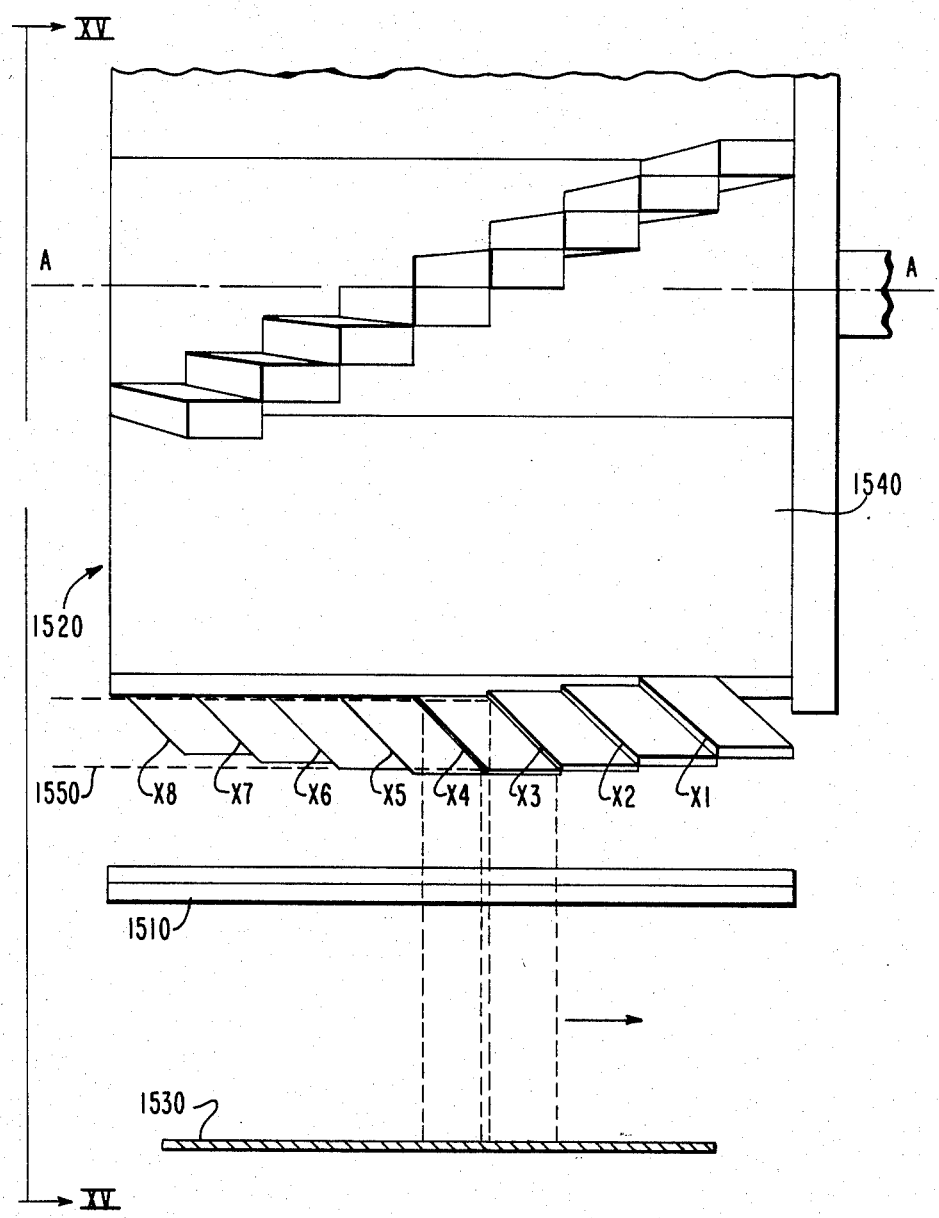
FIG. 14 shows a schematic in partial side view of an embodiment of the present invention for high speed laser scribing of flat sheet.
Figure 15:
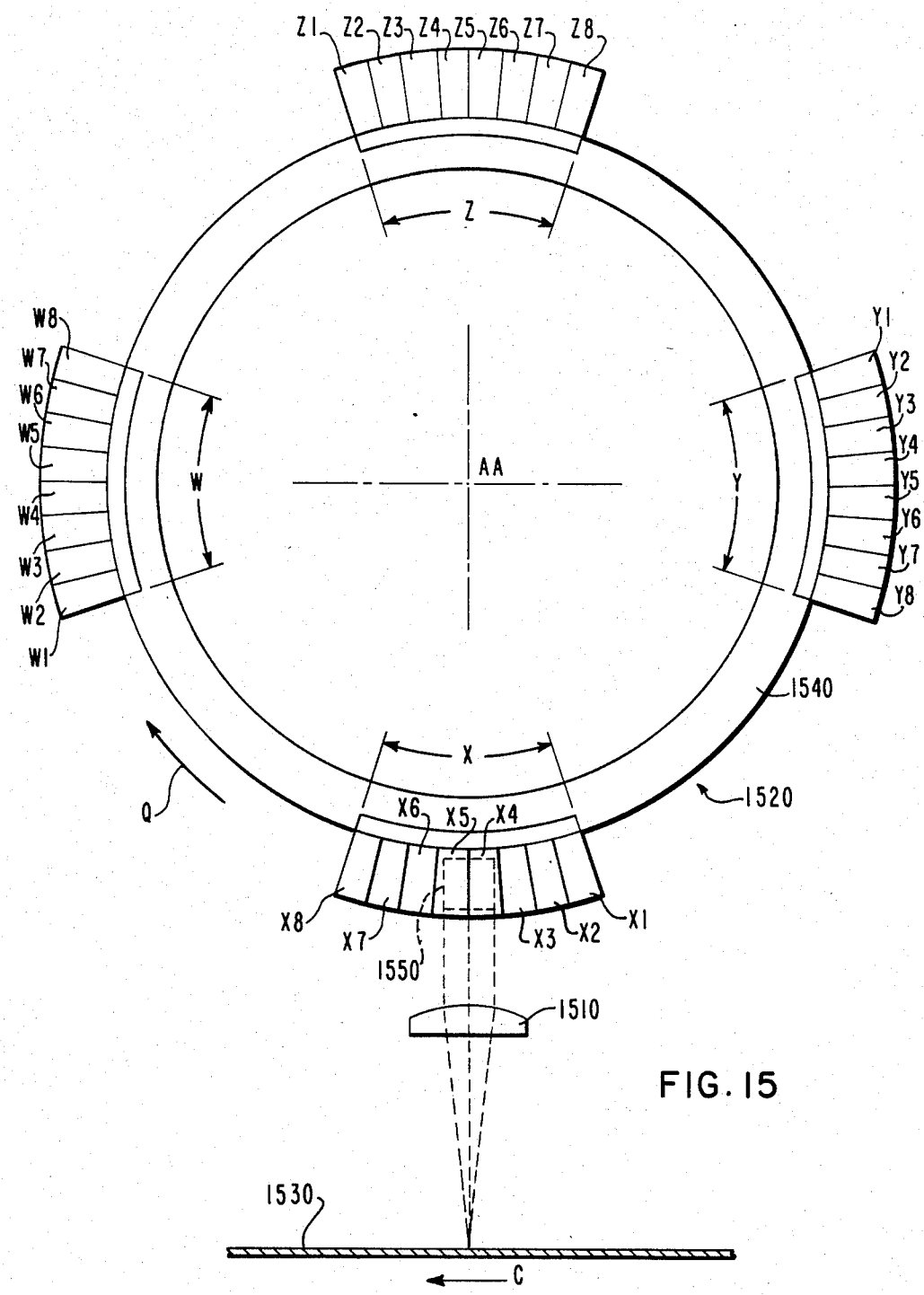
FIG. 15 shows a view of the embodiment shown in FIG. 14 as viewed along arrows XV—XV.

Another embodiment of the present invention is shown in FIGS. 14 and 15. In this embodiment an elongate stationary cylindrical lens 1510 is positioned between the rotating optical system 1520 and a flat ferromagnetic sheet material 1530 being scribed and moving in direction C. The elongate cylindrical lens 1510 is positioned transversely across the width of sheet 1530 and has a length equal to, or greater than, the sheet width.

A rotating optical system 1520 is driven in rotation about axis AA which extends transversely across the sheet width and is aligned parallel to the length of elongate lens 1510. Rigidly, but replaceably, mounted around the periphery of drum 1540 are multiple groups of mirrors. While four groups, W, X, Y, Z, are shown in FIG. 15, systems using additional or fewer groups are also contemplated. Each group contains multiple mirrors, i, where $i=2,3,4\ldots$. In the embodiment shown $i=8$. These mirrors are circumferentially distributed as well as axially distributed around their common axis of rotation, AA, and are at a common radius from axis AA. For example in group X, the eight mirrors X1–X8 are orderly distributed over a length parallel to the common axis of rotation that is at least substantially equivalent to the width of the sheet. What is meant by orderly is that as one moves from one circumferentially adjacent mirror to the next within a group, one moves continuously in stepwise fashion across the width of the sheet as shown in FIG. 14.

The normal of the plane defined by each of the flat mirrors lies in a plane parallel to the plane defined by axis AA and a radial line extending from axis AA and bisecting the arc occupied by each mirror.

When these mirrors are rotated in direction Q into the path of a laser beam 1550 they reflect the beam into elongate cylindrical lens which focuses the beam in an elongate spot on the surface of sheet 1530. As the adjacent mirror is moved into the beam path the reflected laser beam is incrementally moved a distance across the width of the sheet. This process continues until the last mirror in the group at which point the laser has traversed the entire sheet width and may be automatically shut off, to be turned on again when the first mirror in the next group intercepts the laser beam. Preferably, the next group of mirrors intercepts the laser beam immediately after the last mirror in the preceding group. In this manner for each rotation of optical system 1520, multiple scribe lines can be scribed across the width of the sheet with each rotation of this system. The number of multiple mirror groups, and rotational speed of the rotating optical system are chosen to provide the desired spacing between scribe lines for the speed the sheet 1530 is traveling at. The axial spacing between the mirrors within a group may be adjusted as desired to provide a dashed scribe line as shown, or a continuous scribe line.

Figure 16:
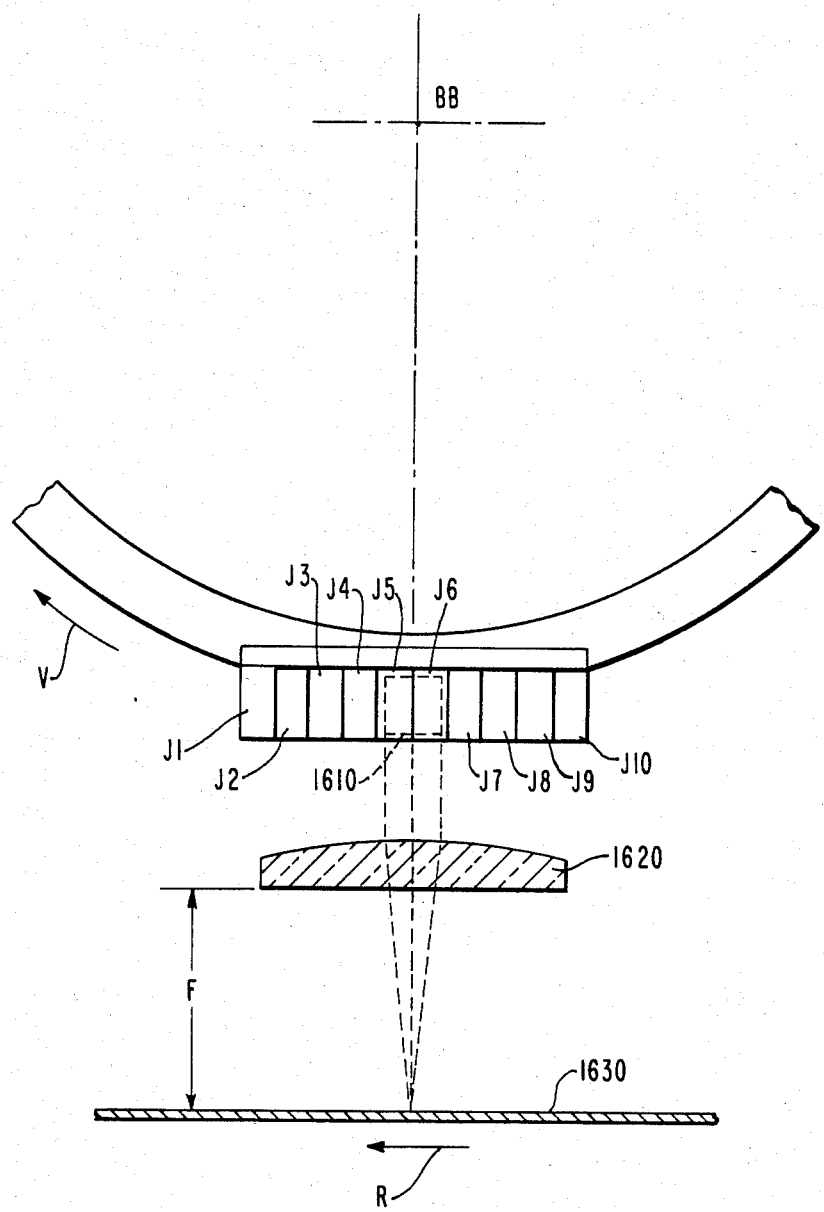
FIG. 16 shows a schematic in partial frontal view of a modification of the present invention as shown in FIGS. 14 and 15.

In a modification of the embodiment shown in FIGS. 14 and 15, the axially distributed mirrors within a group J, J1...J10, shown in FIG. 16 are aligned such that the normals to their mirrored faces are parallel to each other, as opposed to being radially aligned as shown in the embodiment of FIG. 15. It will also be noted that the mirrors within the group J are not all located at a common radius from their axis of rotation BB. Mirrors J1–10 rotating in direction V about axis BB reflect the laser light beam 1610 as they intercept it, and send it through stationary elongate cylindrical lens 1620 which extends across the width of sheet 1630 traveling in direction R. As each mirror in the group intercepts the laser beam 1620, the beam is incrementally moved across the width of the sheet. Cylindrical lens 1620 may be segmentized along its length into 2 or more separate cylindrical lenses.

From an examination of the FIG. 16 embodiment, one can easily see that as the mirror array rotates, the laser beam reflected from the mirror segments will also rotate with a center of rotation coincident with the axis of rotation of the cylinder. As a result of this rotational motion, the position of the laser beams on the cylindrical lens will move. For the conditions shown in FIG. 16, this motion is from right to left. From simple geometrical optics considerations one can show that the position of the focused line segments produced by the cylindrical lens will also move from right to left with a speed $v'\cong\omega F$ where $\omega$ is the angular rotation velocity of the cylinder and F is the focal length of the cylindrical lens as shown in FIG. 16. In order to avoid blurring of the scribed line on the steel, one would like this image speed to match the translational speed, $v$, of the moving steel sheet, thus $v'=v$. If f is the rotation rate of the cylinder one then has the necessary condition $2\pi Ff=v$. For typical values of parameters, e.g., $v=200$ ft/min$=40$ in/sec and $F=1$ in., one has $f=40/2\pi$ rev/sec$\cong 382$ RPM. The other parameters of the system, i.e., number of mirror segments in an array, number of arrays attached to the cylinder, laser beam energy and profile, etc., can be adjusted to optimize the desired magnetic properties of the steel.

Figure 17:
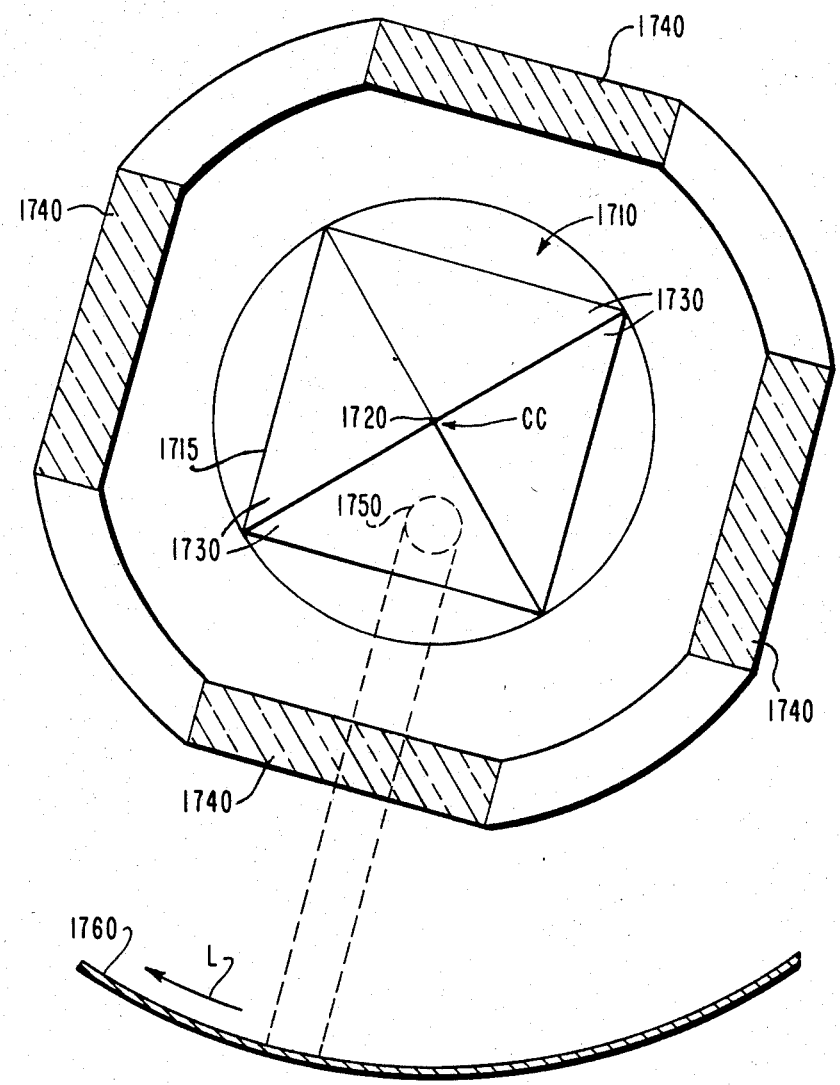
FIG. 17 shows a partial schematic of another embodiment of a rotating optical system for use in the embodiments of the present invention shown in FIGS. 1 and 11.

An optical system for scribing more than one scribe line per rotation on to a curved sheet is shown in FIG. 17. In this embodiment, a pyramidal mirror 1710 is rotationally centered on an axis of rotation cc extending through the geometric center of the base 1715 of the pyramidal mirror 1710 and its apex 1720. Inclined outwardly facing, mirrored faces 1730 extend toward the axis of rotation cc as they extend upwardly from the perimeter of base 1715. Rotatably mounted with said pyramidal mirror 1710 are cylindrical lenses 1740. A cylindrical lens 1740 is provided for each mirror face 1730 and is optically aligned therewith. An incoming laser beam 1750 which is centered over the sheet and parallel to, but not colinear with axis of rotation cc is reflected off mirrored face 1730 through the cylindrical lens 1740 which is aligned, and rotates, with that particular face. In this manner the laser beam is focused in an elongate spot onto the curved sheet 1760 and is scanned across its width in direction L, substantially transverse to the direction of translation of sheet 1760. The four faced pyramidal mirror 1710 shown with four lenses 1740 allows 4 lines to be scribed on a curved sheet with each rotation of the mirror 1710 and lense 1740. Other arrangements having less than or more than the number of mirrored face and lens couples shown are also possible.

Other embodiments of the invention will be apparent to those skilled in the art from a consideration of this specification or practice of the invention disclosed herein. It is intended that the specification and examples be considered exemplary only, with the true scope and spirit of the invention being indicated by the following claims.

We claim:

1. A machine comprising:
   a rotatable means for deflecting a laser beam;
   a means for focusing said laser beam;
   a means for moving a ferromagnetic sheet surface to be treated by said laser beam into the path of said laser beam within a predetermined distance from the focal plane of said focusing means;
   wherein rotation of said rotatable means for deflecting translates said laser beam substantially transverse to the direction of movement of said sheet surface; and
   said means for focusing having optical means for producing an elongate laser beam cross-section on said sheet surface, and said elongate beam cross section having a major axis aligned substantially parallel to the direction of translation of said laser beam across said sheet surface.

2. The machine according to claim 1 further comprising: a laser beam source; and
   wherein said laser beam source is optically aligned with said rotatable means for deflecting a laser beam.

3. The machine according to claims 1 or 2 wherein said means for focusing said laser beam is located between said rotatable means for deflecting a laser beam and said sheet surface.

4. The machine according to claims 1 or 2 further comprising: means for curving said sheet surface wherein said sheet surface has a radius of curvature substantially equal to the distance from said means for deflecting to said sheet surface; and
   wherein said means for focusing is located between said rotatable means for deflecting a laser beam and said sheet surface.

5. The machine according to claim 2 wherein said laser beam source is a continuous wave source.

6. The machine according to claim 5 wherein said continuous wave source is a $CO_2$ laser.

7. The machine according to claim 5 wherein said continuous wave source is a neodymium YAG laser.

8. The machine according to claim 5 wherein said continuous wave source is a neodymium glass laser.

9. The machine according to claim 4 wherein said axis of rotation of said rotatable means for deflecting is substantially parallel to said direction of movement of said sheet surface.

10. The machine according to claim 1 or 2 further comprising means for triggering said laser wherein said laser beam is on only when said path of said laser beam is incident on said sheet surface.

11. The machine according to claim 1 or 2 wherein said sheet surface is planar.

12. A machine comprising:
    a rotatable means for deflecting a laser beam;
    a means for focusing said laser beam;
    a means for moving a planar sheet surface to be treated by said laser beam into the path of said laser beam within a predetermined distance from the focal plane of said focusing means;
    wherein rotation of said rotatable means for deflecting translates said laser beam substantially transverse to the direction of movement of said planar sheet surface; and
    said means for focusing having optical means for producing an elongate beam cross section on said planar sheet surface and said elongate beam cross section having a major axis aligned substantially parallel to the direction of translation of said beam across said planar sheet surface;
    said rotatable means for deflecting having groups of multiple mirrors circumferentially distributed as well as axially distributed around a common axis of rotation;
    said multiple mirrors within each of said groups are orderly distributed over a length parallel to said common axis of rotation that is at least substantially equivalent to the width of said planar sheet surface, and said common axis of rotation is substantially transverse to the direction of movement of said sheet; and
    rotation of said means for deflecting a laser beam sequentially brings each mirror in one of said groups into the path of said laser beam thereby deflecting said beam onto said planar surface while moving said beam across the width of said planar sheet surface.

13. The machine according to claim 12 further comprising a laser beam source optically aligned with said rotatable means for deflecting a laser beam.

14. The machine according to claim 12 or 13 wherein said means for focusing is held stationary between said means for deflecting and said sheet surface and in the path of said laser beam.

15. A process comprising:
    scribing a ferromagnetic sheet material to produce a reduction in watt loss using a laser beam having an incident power, P;
    wherein said ferromagnetic sheet is traveling in a first direction at a speed $S_1$, while said laser beam is traveling in a second direction at a speed $S_2$ substantially transverse to said first direction;
    repeatedly impinging said laser beam on the surface of said ferromagnetic sheet to produce a predetermined beam spot size and geometry on the surface of said sheet, and scribe lines with a predetermined distance between scribe lines;
    wherein said predetermined beam spot geometry is an elongate one;
    and selecting said P and said $S_2$ in such a manner that the following conditions are satisfied:
    (1) $1 < PS_2^{-\frac{1}{2}} < 7$ (watts min$^{\frac{1}{2}}$/in$^{\frac{1}{2}}$);
    (2) the laser beam incident power density; is between about $1 \times 10^3$ and $1 \times 10^5$ watts/cm$^2$; and
    (3) the laser beam incident energy density is greater than 10 and less than about 200 joules/cm$^2$.

16. The process according to claim 15 wherein said predetermined beam spot geometry is an elongate one and wherein P and $S_2$ are selected in such a manner that the following condition is satisfied; $1 < PS_2^{-\frac{1}{2}} < 7$.

17. The process according to claim 15 or 16 wherein $S_1$ is 2 to 1000 feet per minute.

18. The process according to claim 17 wherein $S_2$ is at least 10 times $S_1$.

19. The process according to claim 16 wherein P and $S_2$ satisfy the following condition:

$$1 < PS_2^{-\frac{1}{2}} < 5.$$

20. The process according to claim 16 wherein said predetermined distance between scribe lines is about 0.07 to about 1.0 inch.

21. The process according to claim 16 wherein said predetermined distance between scribe lines is about 0.07 to about 0.25 inch.

22. The process according to claim 16 wherein said laser beam is a $CO_2$ continuous wave laser; and wherein said ferromagnetic sheet material is an insulatively coated high permeability grain oriented silicon steel.

23. A process comprising:
   scribing an insulatively coated grain oriented silicon steel sheet to produce a reduction in watt loss using a laser beam having an incident power, P;
   wherein said coated sheet is traveling in a first direction at a speed $S_1$, while said laser beam is traveling in a second direction at a speed $S_2$ substantially transverse to said first direction;
   repeatedly impinging said laser beam on the surface of said coated sheet to produce a predetermined beam spot size having an elongate geometry on the surface of said coated sheet, and scribe lines with a predetermined distance between scribe lines;
   controlling said P and said $S_2$ within the following conditions:
   (1) $1 < PS_2^{-\frac{1}{2}} < 7$ (watts·min$^{\frac{1}{2}}$/inch$^{\frac{1}{2}}$)
   (2) the laser beam incident power density and incident energy density are sufficient to produce a significant reduction in the watt loss of said coated sheet at an induction of 15 kilogauss, while avoiding damage to the insulative and surface roughness properties of said insulative coating;
   controlling the dwell time of said laser beam on said coated sheet to between about 0.1 and 5 milliseconds; and
   wherein said incident power density is between about $1 \times 10^3$ and about $1 \times 10^6$ watts/cm$^2$.

24. A process comprising:
   scribing an insulatively coated grain oriented silicon steel sheet to produce a reduction in watt loss using a laser beam having an incident power, P;
   wherein said coated sheet is traveling in a first direction at a speed $S_1$, while said laser beam is traveling in a second direction at a speed $S_2$ substantially transverse to said first direction;
   repeatedly impinging said laser beam on the surface of said coated sheet to produce a predetermined beam spot size having an elongate geometry on the surface of said coated sheet, and scribe lines with a predetermined distance between scribe lines;
   controlling said P and said $S_2$ within the following conditions:
   (1) $1 < PS_2^{-\frac{1}{2}} < 7$ (watts.min$^{\frac{1}{2}}$/inch$^{\frac{1}{2}}$)
   (2) the laser beam incident power density and incident energy density are sufficient to produce a significant reduction in the watt loss of said coated sheet at an induction of 15 kilogauss, while avoiding damage to the insulative and surface roughness properties of said insulative coating;
   said scribing including the following steps:
   (a) obtaining said laser beam from a laser beam source;
   (b) deflecting said laser beam onto said surface of said coated sheet by a rotatable deflecting means;
   (c) rotating said rotatable deflecting means to cause said traveling of said laser beam in said second direction across the surface of said coated sheet;
   (d) focusing said laser beam with a means for focusing to produce said elongate geometry beam spot on the surface of said coated sheet; and
   (e) rotating said means for focusing with said rotating rotatable deflecting means about a common axis of rotation.

25. A machine comprising:
   a rotatable means for deflecting a laser beam;
   a means for focusing said laser beam;
   a means for moving a sheet surface to be treated by said laser beam into the path of said laser beam within a predetermined distance from the focal plane of said focusing means;
   wherein rotation of said rotatable means for deflecting translates said laser beam substantialy transverse to the direction of movement of said sheet surface; and
   said means for focusing having optical means for producing an elongate beam cross section on said sheet surface and said elongate beam cross section having a major axis aligned substantially parallel to the direction of translation of said beam across said sheet surface;
   a means for curving said sheet surface wherein said sheet surface has a radius of curvature substantially equal to the distance from said means for deflecting to said sheet surface;
   said means for focusing located between said rotatable means for deflecting a laser beam and said sheet surface; and
   said means for focusing held at a fixed distance from, and rotatable with, said rotatable means for deflecting a laser beam, during the operation of said machine.

26. The machine according to claim 25 further comprising:
   a laser beam source optically aligned with said rotatable means for deflecting a laser beam.

27. A machine comprising:
   a rotatable means for deflecting a laser beam onto a sheet surface;
   a means for focusing said laser beam rotatable with said rotatable means for deflecting a laser beam;
   a means for moving said sheet surface to be treated by said laser beam into the path of said laser beam within a predetermined distance from the focal plane of said focusing means;
   means for curving said sheet surface to a radius of curvature substantially equal to the distance from said means for deflecting to said sheet surface;
   said means for focusing located in said path of said laser beam; and
   wherein rotation of said rotatable means for deflecting translates said laser beam substantially transverse to the direction of movement of said sheet surface.

* * * * *